United States Patent [19]

Itoh

[11] Patent Number: 5,194,315
[45] Date of Patent: Mar. 16, 1993

[54] PACKING SHEET

[75] Inventor: Shinji Itoh, Kuwana, Japan

[73] Assignee: Kabushiki-Kaisha Taihei-Sansho, Kuwana, Japan

[21] Appl. No.: 584,072

[22] Filed: Sep. 18, 1990

[30] Foreign Application Priority Data

Feb. 15, 1990 [JP] Japan .................. 2-13934[U]

[51] Int. Cl.⁵ .................. B32B 3/12; B65D 21/00
[52] U.S. Cl. .................. 428/178; 428/72; 428/74; 428/166; 428/172; 428/175; 428/179; 428/192; 428/284; 428/286; 428/287; 428/402; 206/484.1; 206/484.2; 220/415; 220/429; 220/732; 493/967
[58] Field of Search .................. 423/76, 188, 178, 174, 423/172, 166, 72, 74, 120, 175, 179, 284, 192, 286, 287, 327, 402; 493/967; 206/204, 484.1, 484.2; 220/415, 429, 732

[56] References Cited

U.S. PATENT DOCUMENTS 3,523,055 8/1970 Lemelson .................. 428/178
4,262,046 4/1981 Eitel .................. 428/178
4,287,250 9/1981 Rudy .................. 428/178
4,849,256 7/1989 Newman et al. .................. 428/327
5,000,996 3/1991 Lingenaan .................. 428/72

Primary Examiner—Donald J. Loney
Attorney, Agent, or Firm—Dennison, Messerole, Pollack & Scheiner

[57] ABSTRACT

A packing sheet useful for preserving freshness of flowers, fruits and other foods from deterioration during transport. The packing sheet comprises a central partition sheet, a water permeable sheet having portions of a surface thereof sealed to a surface of the partition sheet, so as to create at least one closed pouch between the water permeable sheet and the central partition sheet, a water absorptive resin contained within the pouch, an air permeable sheet having portions of a surface thereof sealed to the other surface of the central partition sheet so as to create at least one opposite closed pouch between the air permeable sheet and the central partition sheet, and a marginal portion adapted for attachment to a transport case.

9 Claims, 7 Drawing Sheets

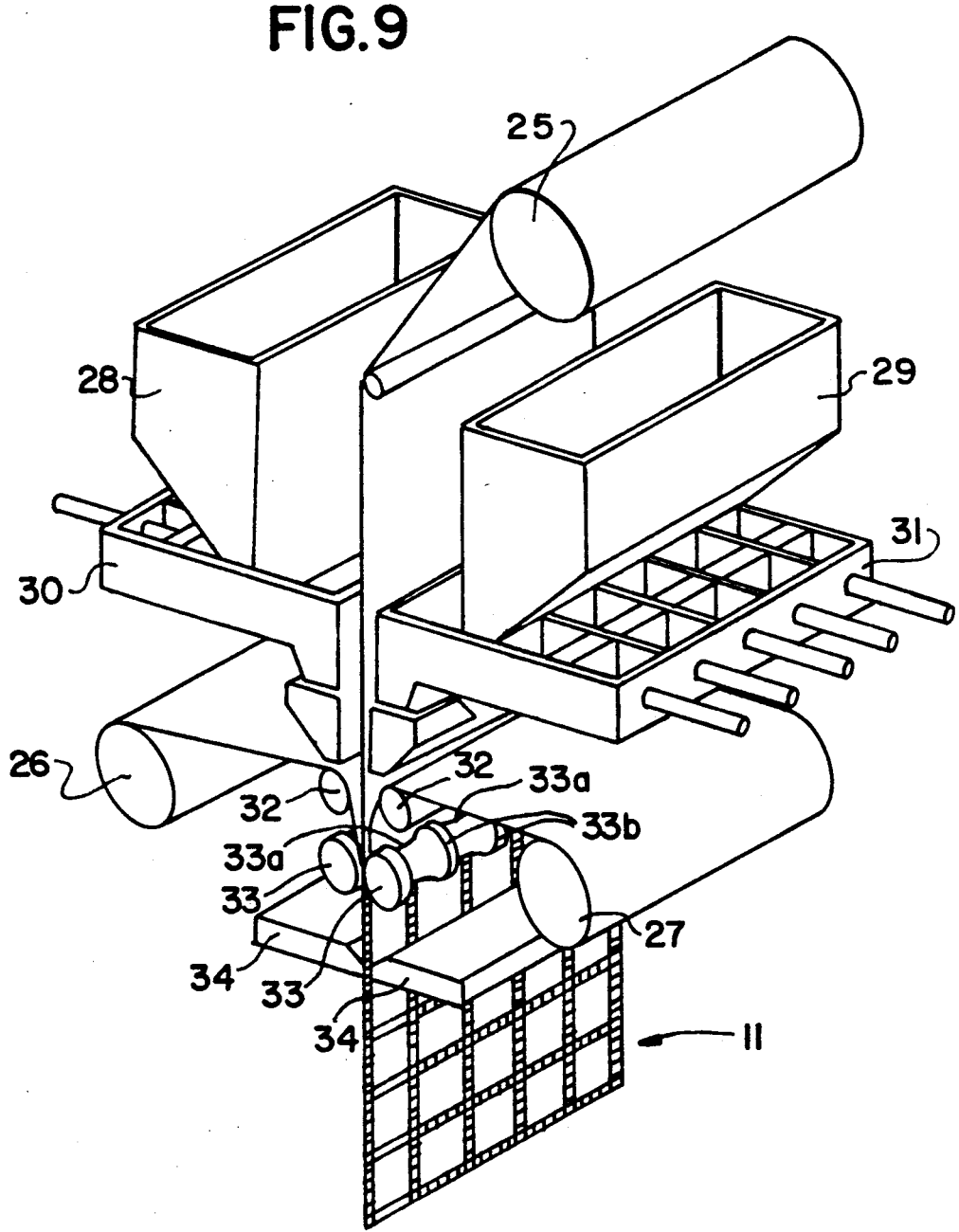

PACKING SHEET

BACKGROUND OF THE DEVICE

1. Field of the Invention

This device relates to an improvement in a packing sheet with which chemicals and the like are enclosed in separate pouched shapes.

2. Related Art

In a packing sheet in which chemicals and the like were enclosed, many pouched space portions were heretofore. With each of these pouched space portions chemicals of a kind or of a function were enclosed alternatively. As a result it was a problem that the packing sheet could fulfill only a simple function.

SUMMARY OF THE INVENTION

This device was conceived in consideration of the above-described conventional problem and its object is to provide a multifunctional packing sheet. The first object of this device is to form pouched space portions both on the inside and on the outside of a central partition sheet material and enclose different substances on each side.

Then, the second object is not only to enclose water absorptive resins at the very least with pouched space portions on the outside but also to enclose the elixir of life and the like in pouched space portions on the inside.

In the first object a packing sheet has pouched space portions which are formed both on the inside and on the outside of a sheet material for partitioning a central portion. Therefore different kinds of chemicals and the like can be enclosed in the pouched space portions on each side and respective functions of the pouched space portions on each side can be carried out separately and independently.

Then, in the second object water absorptive resins are enclosed with the pouched space portions on the outside, and the elixir of life with the pouched space portions on the inside. Then, for example, when this packing sheet is adhered and used in a transport case, fresh flowers and the like can be transported, keeping their freshness well during transport in cold moisture released from water absorptive resins which were cooled in readiness. Moreover, the elixir of life and the like on the other side can carry out the better function of keeping the freshness by controlling the metabolism of fresh flowers.

BRIEF DESCRIPTION OF THE DRAWINGS

FIG. 9 is a perspective view of equipment to mold a packing sheet shown in FIG. 6.

DESCRIPTION OF THE PREFERRED EMBODIMENT

The embodiments of this device will be explained on the basis of the drawings hereinafter.

Figure 1:
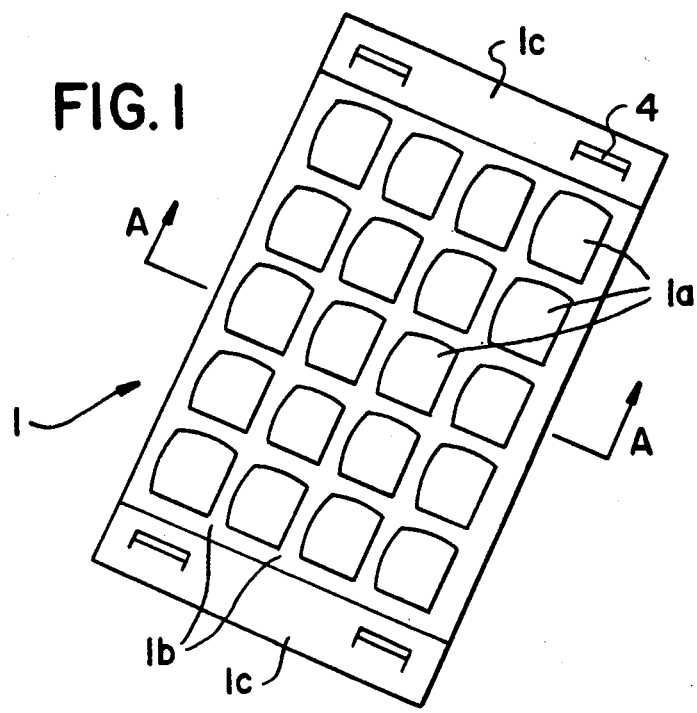
FIG. 1 is a perspective view of a packing sheet.
Figure 2:
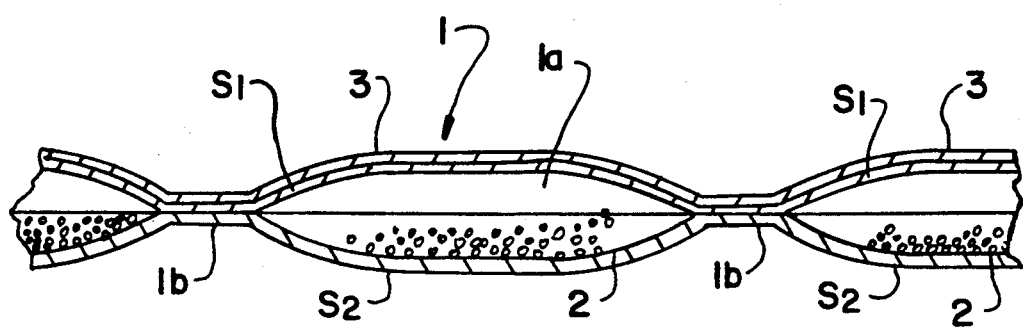
FIG. 2 is a sectional, enlarged view along the line A—A in FIG. 1.

FIGS. 1 and 2 shows a sheet capable of accumulating coolness which is used for transport of fresh flowers and the like.

According to FIGS. 1 and 2, the packing sheet 1 is compartmented into many pouched space portions 1a with the grooves 1b in the vertical and horizontal directions and made up in the form of a sheet. As shown in section in FIG. 2, water permeable sheets S1, S2 constituting the outside portion and the inside portion are adhered together at regular intervals so as to form the groove portions 1b. The pouched space portion 1a containing fair-sized space is formed between the groove portions 1b and large amount of granular water absorptive resins 2 are enclosed with the inner part of this pouched space portion 1a. Further, a waterproof sheet 3 is adhered on the surface of the water permeable sheet S1 on one side.

This water permeable sheet S1, S2 are constituted of the sheet materials which water and air can permeate. Fibrous sheets, such as non-woven fabric, textile, knitting, cotton, can be cited as such sheet materials. Moreover, the waterproof sheet 3 is formed of water impermeable sheet materials, for example, plastic sheets, such as polyethylene, polypropylene, polyvinyl chloride. Aluminum foil can be used instead of a plastic sheet.

Moreover, examples of the water absorptive resins 2 to be enclosed in the pouched space portion 1a, are copolymers of cross-linking reagents with monomer of hydrolytic products of starch-acrylonitrile graft polymer, cellulose-acrylonitrile graft polymer and the like, that is, cross-linked polyacryloamido and its hydrolytic products cross-linked polyethylene sulfonate, cross-linked POVAL (Kuraray), cross-linked vinylester-unsaturated carboxylate sulfonic copolymer described in Japanese publication No. Tokkaisho 52-14,689 and Tokkaisho 52-27,455, cross-linked polyacrylic salt and acrylic acid-acrylic acid ester copolymer, cross-linked isobutylenemaleic acid anhydride copolymer, and cross-linked polyethylene oxide and the like. Furthermore, self-cross-linking polymer, that is, self-cross-linking type of polyacrylic acid, resins described in Tokkaisho 54-30,710 and high molecular polymer containing both hydroxyl group and carboxylate group at least in a molecule, for example, resins described in Tokkaisho 54-37,994 will do. Further, water absorptive resins yielded by polymerizing starch or cellulose, soluble monomer and/or solubilized monomer by hydrolysis, and cross-linked reagent as essential components and by hydrolyzing them, if necessary, will do as well.

One or more then two kinds of the above-mentioned absorptive resins can be used, and water absorptive capacity is desirable to be about 20-2000 g/g, and the shape of water absorptive resins 2 is not specially definite. Any shape, that is, powdery shape, granular shape, flaky shape or fibrous shape, will do.

Figure 3:
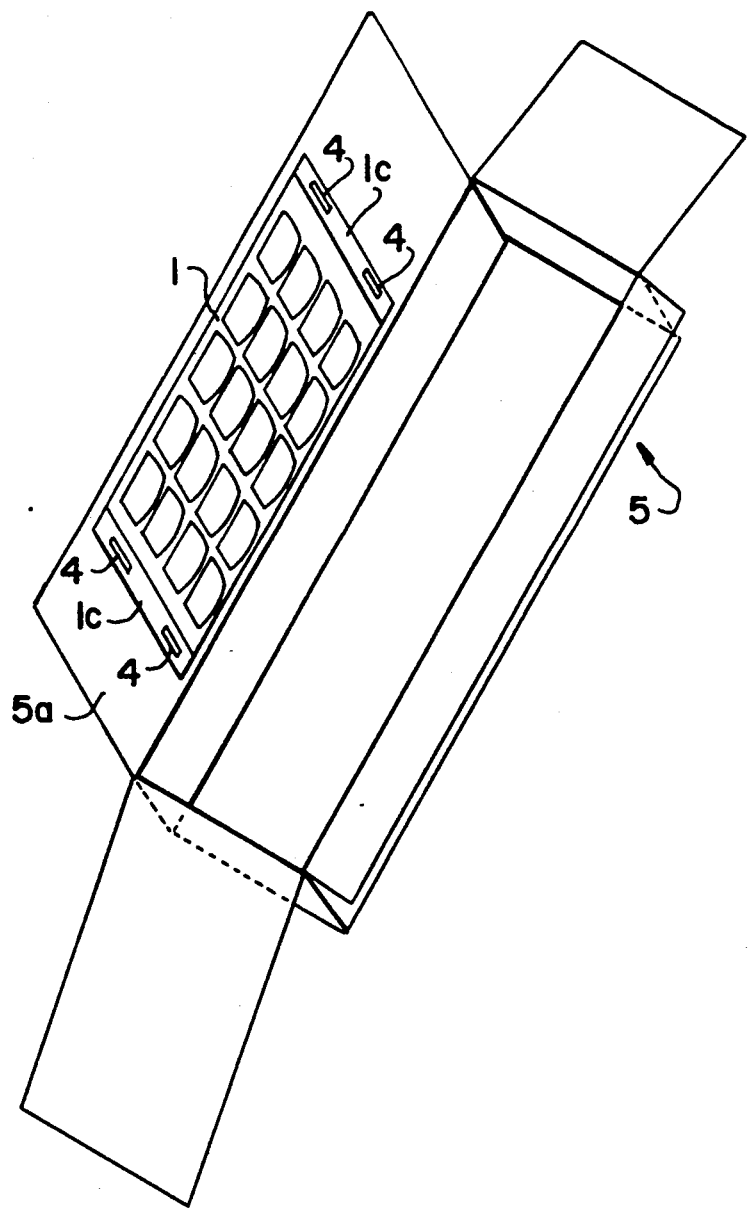
FIG. 3 is a perspective view of a transport case for transporting fresh flowers with a packing sheet of FIG. 1.

The packing sheet 1 constituted in this way can be used by being fixed by the staples 4, 4 and the like to the inside of the upper flap 5a on the upper face side of the flower transport case 5 in which fresh flowers and the like can be packed, for example, as shown in FIG. 3. That is to say, the protrusive portions 1c, 1c which do not have the pouched space portions 1a are solidly formed, as shown in FIG. 1, in the edge portion of the longitudinal side of the packing sheet 1, and the packing sheet 1 can be fixed to the inside of the upper flap 5a of flower transport case 5 by driving the staples 4, 4 and the like into these protrusive portions 1c, 1c respectively.

Further, in the case of fixing the packing sheet 1 to the inside of the upper flap 5a, the packing sheet 1 will be soaked in water beforehand, taken out afterward and cooled in a freezer in readiness. Water permeates from the water permeable sheet S2 into the pouched space portion 1a and is absorbed in the inside of the water absorptive resins 2. When the packing sheet is frozen in this condition water in the water absorptive resins 2 have accumulation of coolness. When carnations, roses and the like are packed in the flower transport case 5 and delivered at the addressee's house, cold moisture is released gradually from the water absorptive resins 2 during transport and can keep the inside of the flower transport case 5 cool. Therefore, deterioration of fresh flowers during transport can be held down to a minimum.

Further, in the case of using this packing sheet 1, even if dew condensed water appears on the surface of the packing sheet 1, the inner water absorptive resins 2 can absorb this dew condensed water and the like and keep the dew condensed water from dripping. Then, even when the flower transport case 5 is formed out of corrugated paper and the like, water does not soak into the transport case 5. Therefore, lowering of strength of the transport case 5 can be held down to a minimum.

Further, when the packing sheet 1 is fixed to the upper flap 5a, adhesive tapes, such as gum tape and cloth tape, can be used to fix it, or adhesive agents and the like can be used to paste it, besides the staples 4.

If the inside of the flower transport case 5 is laid with laminates, such as polyethylene laminate, polypropylene laminate, biphenylchloride film laminate, the protrusive portion 1c of the packing sheet 1 can be thermally welded to the laminate materials. When the protrusive portion 1c is heat-sealed to these laminate materials, the fixing operation of the packing sheet 1 to the flower transport case 5 can be performed successively in use of a special sealing machine. Therefore, it is possible to make a production line at the shipment point of fresh flowers and the like.

The flower transport case 5 whose inside is all laminated shows excellent heat-barrier effect, and can be an excellent transport case 5 in its strength.

Because the packing sheet 1 of this embodiment is in separate pouched shape with many pouched space portions 1a, 1a, ±a, accumulative cooling chemicals are not centered on a part, but they are uniformly distributed throughout the sheet. Therefore, the uniform cold moisture can be provided to most parts of the flower transport case 5.

In the case of the packing sheet 1 as shown in FIG. 2 it is desirable to use it with the water proof sheet 3 pasted up to the upper flap 5a.

Figure 4:
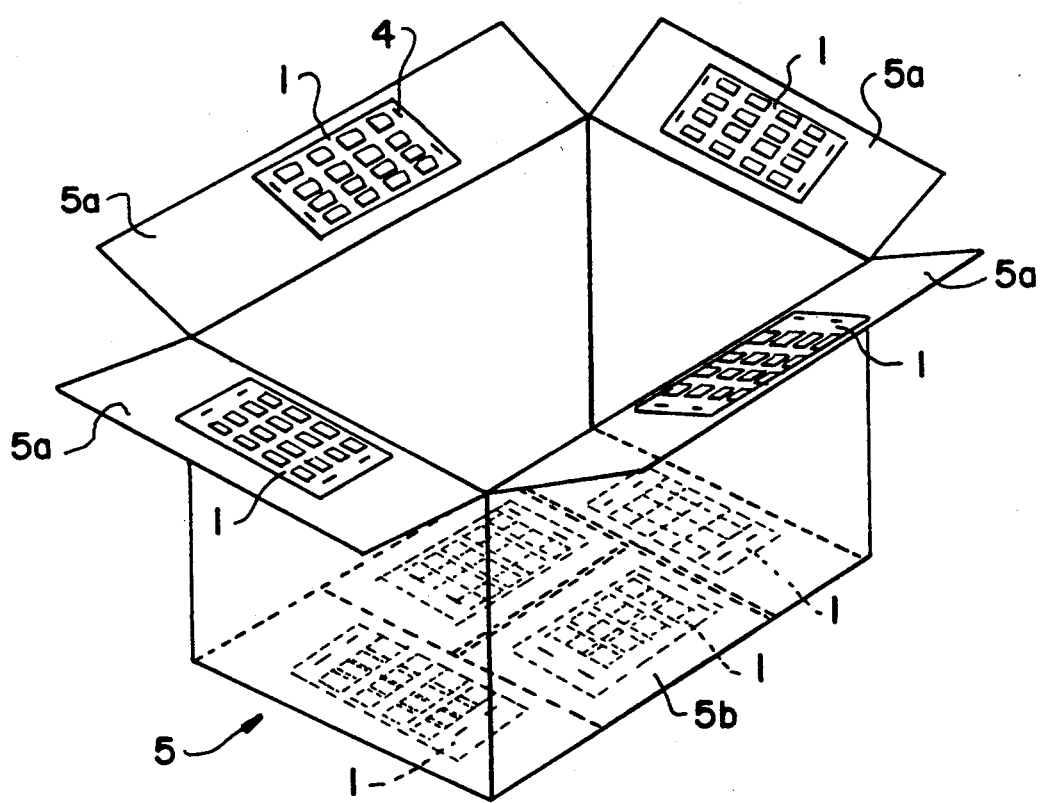
FIG. 4 is a perspective view of another transport case with a packing sheet of FIG. 1.

Moreover, the packing sheet 1 can be used for the transport case 5 as shown in FIG. 4. That is to say, the transport case 5 can be used with the packing sheet 1 fixed not only to the inside of the upper flaps 5a, 5a respectively but also to the sides of the lower flaps 5b respectively. Further, in this case, the packing sheets 1 fixed to the sides of the lower flaps 5b can contain water and be cooled in readiness, but it is also fixed and used in such a condition as not to contain water and when dew condensed water and the like do appear in the transport case 5 during transport, the water absorptive resins in the packing sheet 1 absorb the dew condensed water and the like. It becomes possible to transport in such a good condition as to have no water soaked in the transport case 5 and the like. Then, the packing sheets 1 on the sides of the lower flaps 5b mainly function as a moisture-absorbent.

Figure 5:
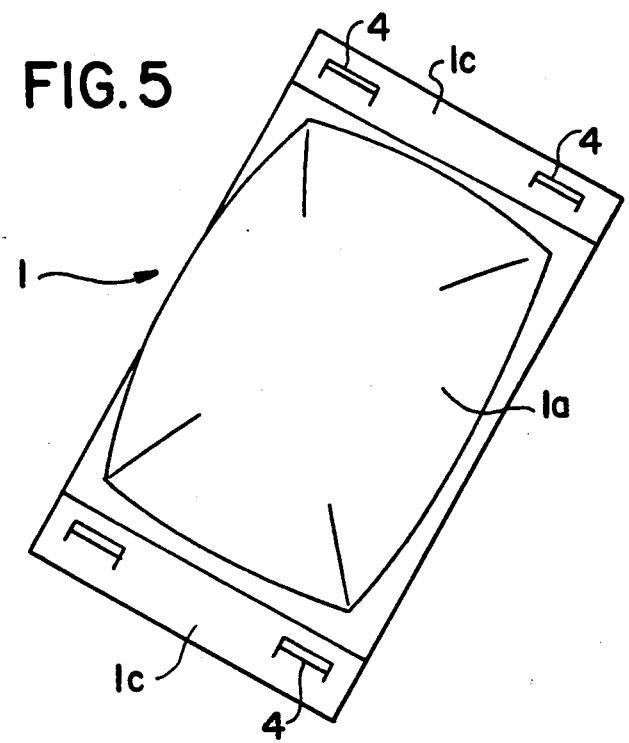
FIG. 5 is a perspective view showing a variant example of a packing sheet.

Further, the packing sheets 1 are shown with a plurality of pouched shapes in FIG. 1 and in FIG. 2, but can be formed with only one pouched space portion 1a as shown in FIG. 5. In this case, too, if the protrusive portions 1c, 1c are formed at both edges respectively, the sheet can be fixed well to the flap portion of the transport case 5 and the like through these protrusive portions 1c, 1c.

Figure 6:
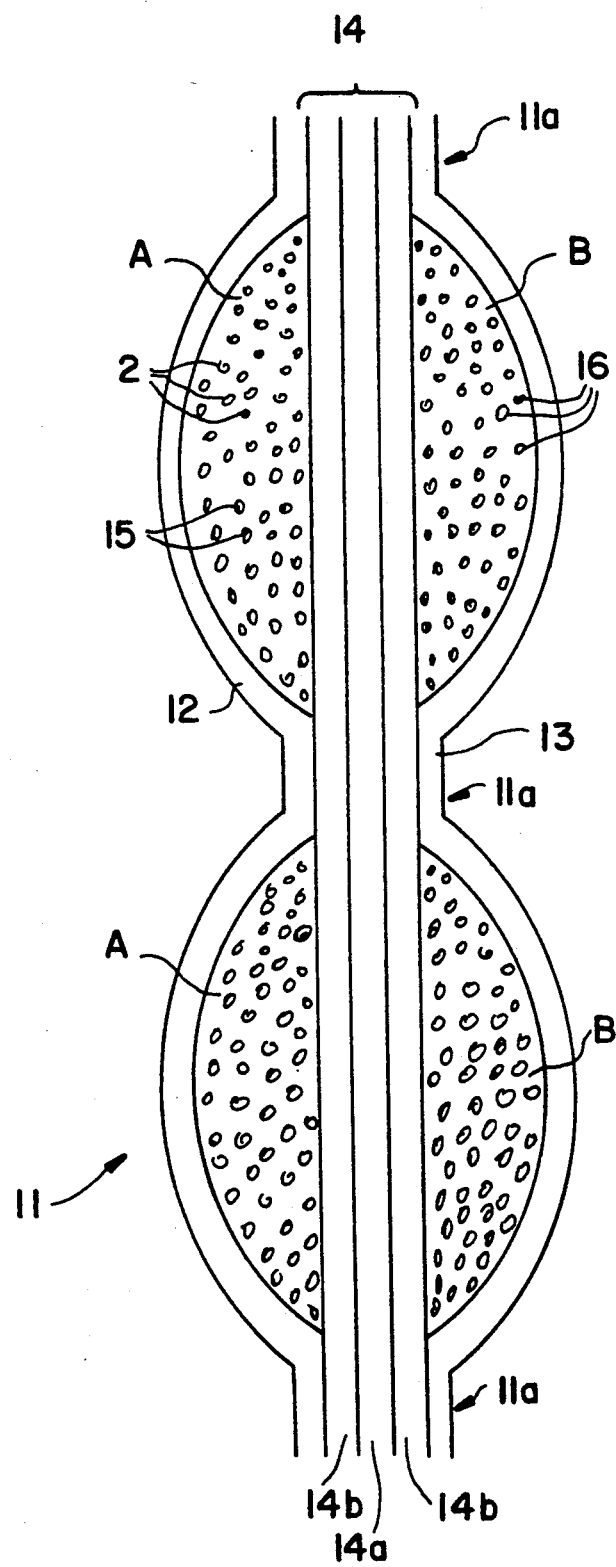
FIG. 6 is a sectional, enlarged view of a principal part of a different structure of a packing sheet.

Furthermore, the packing sheet can also be formed in such a structure as shown in the sectional magnified drawing of FIG. 6. That is to say, the pouched space portions A, B are simultaneously formed on the inside and on the outside of the packing sheet 11, and the partition sheet material 14 is disposed in its center portion. This partition sheet can be formed in a triple structure. Namely, the high melting point normal chain low density polyethylene layer 14a is formed in its center portion, and the low melting point normal chain polyethylene 14b, 14b are disposed on its inside and outside. This partition sheet material 14 can also be formed to be in the shape of a sheet out of low density melting point normal chain polyethylene as well as in a sandwich structure.

The non-woven fabric 12 is disposed on the surface of one side of the packing sheet 11 and the air permeable plastic film 13 is disposed on the surface of the other side. As the non-woven fabric 12 polyester-nylon spun bond non-woven fabric, olefin spun bond non-woven fabric and the like are used and show excellent water permeation. On the other hand, as the air permeable plastic film 13 low density polyethylene, vinyl chloride, polycarbonate, polypropylene, nylon, hydrochloride gum, VINYLON (which is a trademark for a polyvinyl alcohol synthetic fiber material) and the like are used and can form small pores which water cannot pass but air can.

The partition sheet material 14, the non-woven fabric 12 and the air permeable plastic film 13 are thermally welded at stated intervals, and the grooves 11a are formed. The pouched space portions A, B are formed in separate pouched shape on the inside and on the outside respectively. To take an example, the water absorptive polymer 2, silica gel 15 and the like can be enclosed in the pouched space portion A and the elixir of life, gas adsorbent, deoxidant (iron powder), oxygen generator, carbon dioxide generator, ethylene adsorbent 16 and the like can be enclosed in the other pouched space portion B.

Figure 7:
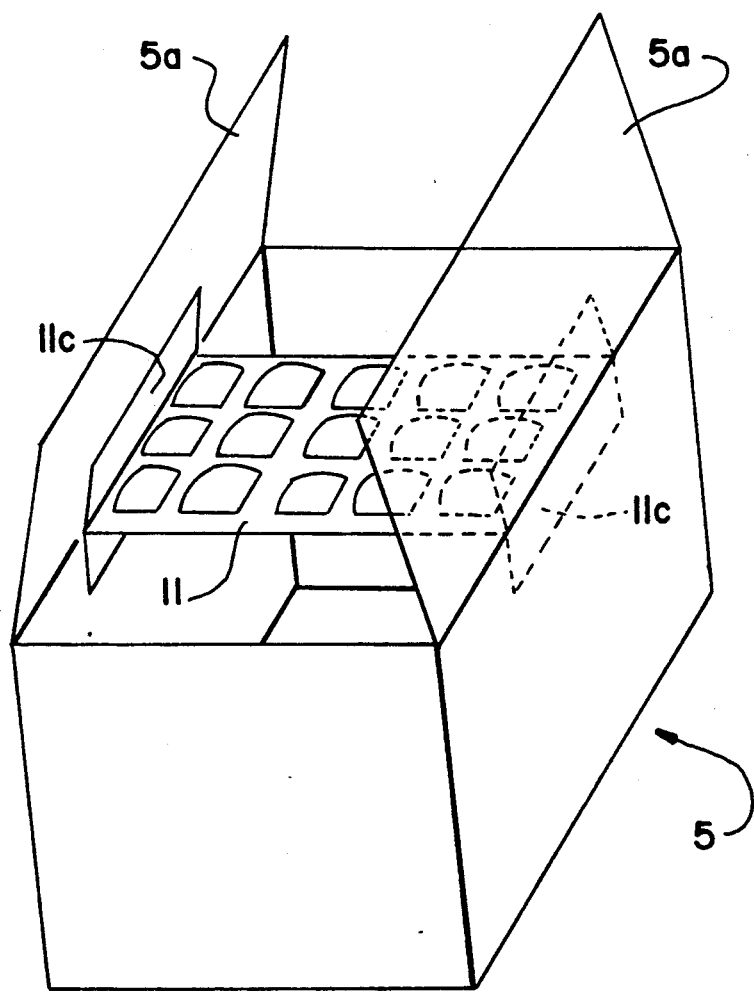
FIG. 7 is a perspective view of a case of using a packing sheet of FIG. 6 as a transport case.

The packing sheet 11 formed in this way can be used, for example, as shown in FIG. 7, where it is disposed to span the upper portion parts of the flower transport case 5 and where the protrusive portions 11c formed at both edges of the packing sheet 11 are adhered on the inside of the upper flaps 5a, 5a of the transport case 5 or on the inside of the transport case 5 itself by means of a double-faced tape, thermal welding, high frequency sealing and the like. When it is transported in such a condition, that is to say, when the said pouched space portion A is located at the bottom side and the pouched space portion B at the top side, in such a condition that the water absorptive polymer 2 in the pouched space portion A which contained water and was cooled in readiness, cold moisture is released into the transport case 5 and provides an excellent chill. At the same time, the elixir of life, ethylene adsorbent and the like which are enclosed in the pouched space portion B of the top side can act on ethylene gas, carbon dioxide gas and the like which appear in the transport case 5 and adsorb them well. Then, a better condition of freshness can be obtained.

Figure 8:
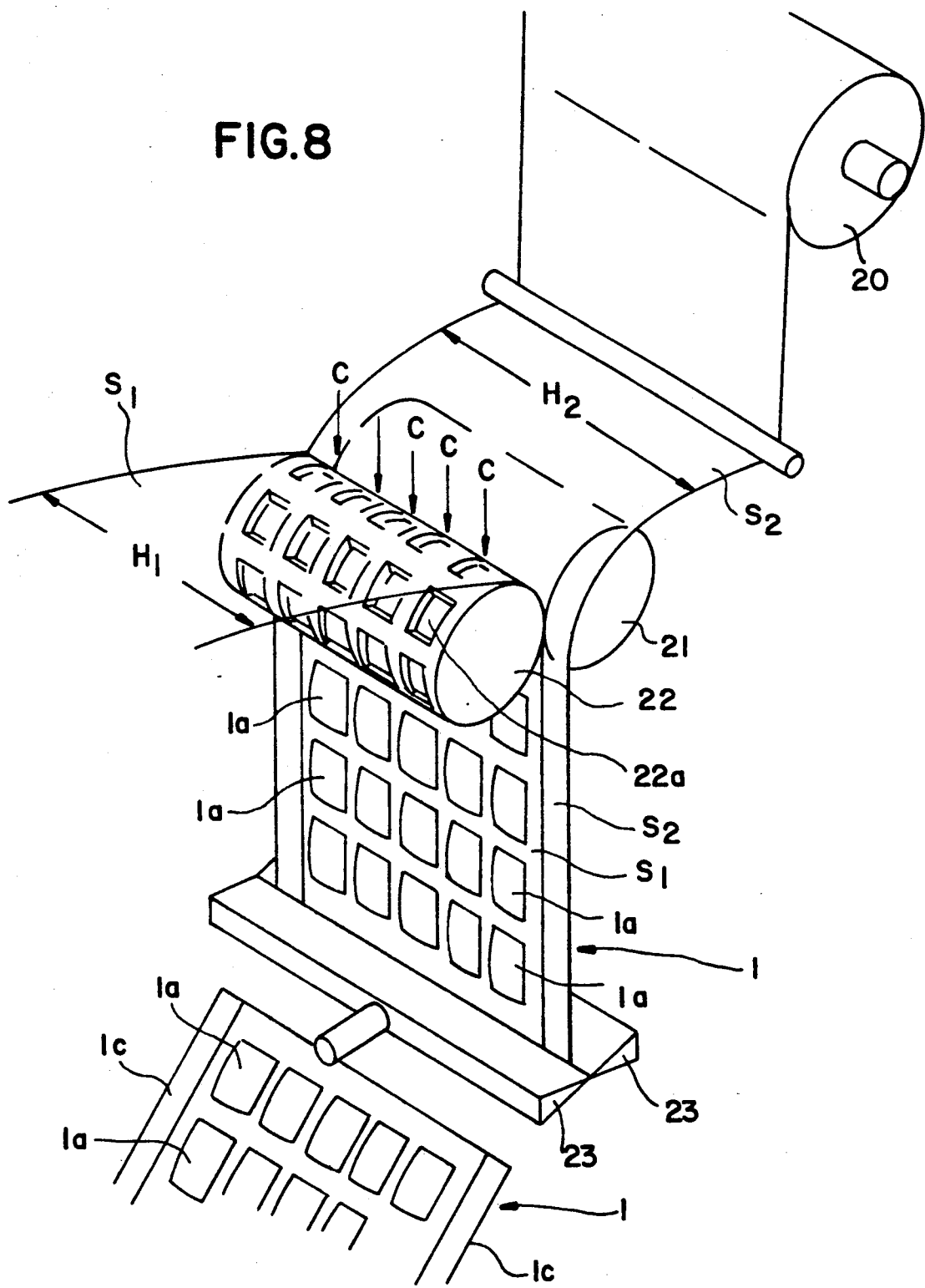
FIG. 8 is a perspective view of equipment to mold the packing sheets shown in FIG. 1 and FIG. 2.

FIG. 8 shows an outlined perspective view of the equipment to mold the packing sheet 1 as shown in FIG. 1 and FIG. 2.

The equipment has the drums 20, 20 around which the water permeable sheets S1, S2 are rolled respectively, and passes both sheets S1, S2 through between a pair of the heat rollers 21, 22 in the process of drawing out the sheets S1, S2 separately from the respective drums 20. This equipment thermally welds and unites the water permeable sheets S1, S2 between this pair of the heat rollers 21, 22. Further, many hollows 22a are formed in hollow-shape on the circumferential faces of both or one of the heat rollers. The parts of the hollows 22a are not thermally welded and the pouched space portions 1a are formed in separate pouched shape on these parts. The united sheets S1, S2 are cut to an adequate length with the cutters 23, 23 and completed to be the packing sheet 1. Further, by letting the water absorptive resins 2 fall through a hopper from the upper part of a pair of the heat rollers 21, 22, the water absorptive resins 2 can be enclosed sufficiently with the pouched space portion 1a.

Further, in this embodiment the width H1 of the water permeable sheet S1 on one side is formed shorter than the width H2 of the water permeable sheet S2 on the other side and the length in an axis direction of the said heat rollers 21, 22 is set up equivalent to the width H1. Therefore, at the both edges of the packing sheet 1 which is completed when it is thermally welded and united together, the protrusive portion 1c made of only the water permeable sheet S2 on one side.

FIG. 9 shows the equipment to mold the packing sheet 11 shown in the FIG. 6.

The equipment shown in FIG. 9 is disposed with the drum 25 in the upper part around which the partition sheet material 14 is rolled, and with a pair of hoppers 28, 29 in its lower part and with control gauges 30, 31 in the lower part of the hoppers 28, 29 respectively. In this hopper 28, for example, the water absorptive polymer 2 can be contained, and in the hopper 29 the elixir of life, active carbon and the like can be contained. The control gauges 30, 31 are formed in plural measure shape respectively. In order to get the packing sheet 11 in separate pouched shapes, the water absorptive polymer are placed into every measure in proper quantity in a condition to be dispersed. In the lower part of a pair of the control gauges 30, 31, the drum 26 around which the non-woven fabric 12 is rolled and the drum 27 round which the air permeable plastic film 13 is rolled are disposed facing each other. From drums 26, 27 the nonwoven fabric 12 and the air permeable plastic film 13 are supplied and united to the partition sheet material 14 which is supplied from the drum 25. A pair of the heat rollers 32, 32 are disposed in order to weld thermally the sheets 12, 13, 14 at fixed intervals in a drawing direction and are kept heated. When a pair of the heat rollers 32, 33 becomes in a condition to draw close to each other, the groove 11a is thermally welded and formed. At this moment, as above-mentioned, through the control gauges 30 and 31 the water absorptive polymers are allowed to fall and enclosed in the sheet. A pair of the heat rollers 33, 33 are disposed in the lower part in order to form the groove 11a in a vertical direction of the packing sheet 11. The concave part 33a and the convex part 33b are formed at fixed intervals in a horizontal direction. When every convex part 33b of a pair of the heat rollers 33, 33 is continuously rotated in a condition to draw close to each other, the grooves 11a which are thermally welded are continuously formed in a vertical direction on the packing sheet 11. Thus, by both pairs of heat rollers 32, 32 and 33, 33 in the lower part, the packing sheet 11 is continuously molded, and then, it is cut at fixed intervals with the cutters 34, 34, so that the packing sheets 11 are completed.

Because pouched space portions are formed both on the inside and on the outside of the central partition sheet material respectively and different chemicals are enclosed with the pouched space portions on each side respectively, the packing sheet of this device can carry out, the separate and independent functions on the inside and on the outside respectively. Therefore, it becomes possible for one sheet to carry out various functions by itself. Moreover, the packing sheet is able to keep and transport goods by means of a handy sheet whose inside and outside contain completely different substances.

Moreover, because the water absorptive resins at the very least are enclosed with the pouched space portions on the outside and the elixir of life and the like are enclosed with the pouched space portions on the inside, if the water absorptive resins on the outside contain water and are cooled in readiness, cold moisture can be released from the outside during transport. To take an example, when this packing sheet is used in a flower transport case, it makes it possible to transport in a good, fresh condition by means of cold moisture. Further, the packing sheet fulfills the effect of prolonging life independently by means of the elixir of life and the like on the inside. Therefore, the packing sheet of this device can protect fresh flowers, other fruits, foods and the like from deterioration during transport.

What is claimed is:

1. A packing sheet comprising:
   a central partition sheet having first and second surfaces;
   a water permeable sheet having portions of a surface thereof sealed to said first surface so as to create at least one closed pouch between said water permeable sheet and said central partition sheet;
   water absorptive resin contained within said at least one closed pouch;
   an air permeable sheet having portions of a surface thereof sealed to said second surface, so as to create at least one opposite closed pouch between said air permeable sheet and said central partition sheet; and
   a marginal portion for attachment to a transport case.

2. A packing sheet according to claim 1, wherein said air permeable sheet is also water permeable and said opposite closed pouch contains water absorptive resin.

3. A packing sheet according to claim 1, wherein said air permeable sheet comprises a waterproof sheet laminated to a water-permeable sheet.

4. A packing sheet according to claim 1, wherein said opposite pouch contains a substance selected from gas adsorbent, deoxidant, oxygen generator, carbon dioxide generator, or ethylene adsorbent.

5. A packing sheet according to claim 1, wherein said water-permeable sheet is a non-woven fabric.

6. A packing sheet according to claim 1, wherein said air permeable sheet is selected from porous polyethylene, polypropylene, polyvinyl chloride, polycarbonate, nylon or polyvinyl alcohol fibers.

7. A packing sheet according to claim 1, wherein said water-absorptive resin is granular.

8. A packing sheet according to claim 1, wherein said water-absorptive resin is selected from starch-acrylonitrile graft copolymer, cross-linked polyethylene sulfonate, cross-linked polyvinyl alcohol, cross-linked vinylester-unsaturated carboxylatesulfonic copolymer, cross-linked acrylate and acrylic acid, acrylic acid ester copolymer, cross-linked isobutylene maleic acid anhydride copolymer or cross-linked polyethylene oxide.

9. A packing sheet according to claim 1, wherein said resin is saturated with water.

* * * * *